United States Patent [19]
Lee et al.

[11] Patent Number: 5,985,993
[45] Date of Patent: Nov. 16, 1999

[54] METHOD FOR PREPARING POLYBUTADIENE LATEX

[75] Inventors: Byeong-do Lee, Kwangju; Dong-un Jin, Seoul, both of Rep. of Korea

[73] Assignee: Cheil Industries, Inc., Taegu, Rep. of Korea

[21] Appl. No.: 08/775,462

[22] Filed: Dec. 30, 1996

[30] Foreign Application Priority Data

Aug. 1, 1996 [KR] Rep. of Korea ........................ 96-32145
Sep. 5, 1996 [KR] Rep. of Korea ........................ 96-38322

[51] Int. Cl.$^6$ ........................................................ C08J 9/04
[52] U.S. Cl. ............................ 524/832; 524/835; 524/836
[58] Field of Search .................................... 524/836, 832, 524/833

[56] References Cited

U.S. PATENT DOCUMENTS

| | | | |
|---|---|---|---|
| 3,049,500 | 8/1962 | Howland et al. | 260/17.4 |
| 3,330,795 | 7/1967 | Schluter | 260/29.7 |
| 3,403,125 | 9/1968 | Graham | 260/29.7 |
| 5,294,659 | 3/1994 | Kidder | 524/458 |
| 5,510,399 | 4/1996 | Sauer | 523/335 |

FOREIGN PATENT DOCUMENTS

| | | |
|---|---|---|
| 0 029 613 | 6/1981 | European Pat. Off. . |
| 0 143 869 | 6/1985 | European Pat. Off. . |
| 0 406 806 A2 | 1/1991 | European Pat. Off. . |
| 56-45921 | 10/1981 | Japan . |
| 58-61102 | 4/1983 | Japan . |
| 1-32842 | 7/1989 | Japan . |
| 94-10341 | 10/1994 | Rep. of Korea . |
| 96-854 | 1/1996 | Rep. of Korea . |

OTHER PUBLICATIONS

Translation of claims of Laid–Open Japanses Application, Publication No. 56–459211 (Oct. 29, 1981).
Translation of claims of Laid–Open Japanese Application, Publication No. 58–61102 (Oct. 29, 1981).
Translation of claims of Laid–Open Japanese Application, Publication No. 1–32842 (Jul. 10, 1978).
Translation of claims of Korean Published Patent Application, Publication No. 94–10341 (Oct. 22, 1994).
Translation of claims of Korean Published Patent Application, Publication No. 96–854 (Jan. 13, 1996).

*Primary Examiner*—Peter D. Mulcahy
*Attorney, Agent, or Firm*—Maria Parrish Tungol; John A. Parrish

[57] ABSTRACT

A method for preparing a polybutadiene latex comprises providing an emulsion polymerization medium by reacting water, butadiene monomers, a surfactant, a chain transfer agent, an initiator and an electrolyte, preferably at a temperature of about 60~80° C., preferably for about 8~16 hours, and agglomerating the resulting emulsion polymerization medium, preferably at a temperature of about 5~20° C. higher than the polymerization temperature, preferably for about 4~12 hours by adding a surfactant and an agglomerating agent to the emulsion polymerization medium in consecutive order. The agglomerating agent is prepared a method comprising a first step of forming agglomerating seeds by batch polymerization of an alkyl acrylate of $C_1$~$C_{12}$, an anionic surfactant and an anionic initiator, a second step of growing the agglomerating agent in semi-batch polymerization by adding an alkyl acrylate of $C_1$~$C_{12}$ and an ionic comonomer to the resulting polymer of the first step, and a third step of copolymerizing the ionic comonomer at the surface of the agglomerating agent to be prepared in a sufficient amount, by adding an alkyl acrylate of $C_1$~$C_{12}$, an ionic comonomer and an anionic initiator to the resulting polymer of the second step.

14 Claims, No Drawings

METHOD FOR PREPARING POLYBUTADIENE LATEX

FIELD OF THE INVENTION

The present invention relates to methods for preparing a polybutadiene latex. More particularly, the present invention relates to methods for preparing a polybutadiene latex, which can reduce reaction times in polymerization of butadiene and agglomeration of polybutadiene when a polybutadiene latex is produced.

Also, the present invention includes an agglomerating agent for effectively agglomerating polybutadiene latices, and methods for preparing the agglomerating agent.

BACKGROUND OF THE INVENTION

In general, rubbery latex is used in preparation of impact-resistant resin compositions for improving impact strength thereof. An agglomerating agent is used for preparing the rubbery latex. Various methods for agglomerating rubbery latices have been employed up to now.

For example, in preparation of ABS resin which is impact-resistant, the resin is prepared by agglomerating polybutadiene rubber particles with an agglomerating agent, graft-polymerizing monomers of styrene and acrylonitrile onto the polybutadiene latex, and mixing the grafted polymer and SAN (styrene-acrylonitrile) copolymer.

In an impact-resistant resin, particle sizes of rubbery latex affects impact-strength of a molded article of the resin, as well as other physical properties thereof.

Generally, it is preferable that the particle sizes of the rubbery latex are in the range of 0.25~1.0 $\mu$m. For preparing the rubbery latex having particle sizes of 0.25~1.0 $\mu$m, there have been various researches on agglomerating agents, methods for preparing the agents, and methods for agglomerating rubbery latices.

Japanese Patent Publication No. 56-45921 discloses a method for increasing particle size of synthetic rubbery latex using a latex that is polymerized from 97~70% by weight of an alkyl acrylate of $C_1$~$C_{12}$ and 3~30% by weight of an unsaturated acid in the presence of an anionic surfactant.

Japanese Patent Laid-open No. 58-61102 discloses a latex as agglomerating agent which is prepared by emulsion-polymerization of an unsaturated acid, an alkyl acrylate, and monomers polymerizable therewith, and a method for preparing the latex.

Japanese Patent Publication No. 1-32842 discloses a latex as agglomerating agent which is prepared by emulsion-polymerization of an unsaturated acid, diene monomers, and monomers polymerizable therewith, and a method for preparing the latex.

U.S. Pat. No. 3,049,500 teaches a method of increasing the size of the polymer particles in a synthetic rubber latex of a copolymer of butadiene-1,3 and styrene which comprises incorporating in the latex of polyvinyl methyl ether and an alkali salt electrolyte.

U.S. Pat. No. 3,330,795 teaches a latex consisting essentially of a mixture of a synthetic rubber dispersion and an oxidized polyalkylene oxide having a molecular weight within the range from 3,000 to 30,000 and a substantial —C=O group content of not more than 8%.

U.S. Pat. No. 3,403,125 discloses a method for agglomerating a rubber latex using an agglomerating agent obtained by reacting a polyoxyethylene glycol with the diepoxide obtained by condensing epichlorohydrin with a polyhydric (alcohol) phenol.

European Publication No. 0029613 A1 discloses an agglomerating latex containing (1) a polymer selected from (a) homopolymers of alkyl acrylates and methacrylates in which the alkyl has from 1 to 12 carbon atoms, and (b) copolymers of ethylenically unsaturated monomers capable of forming water insoluble homopolymers, and (2) a non-ionic surfactant consisting of an addition product of ethylene oxide.

European Publication No. 0143858 A1 discloses an agglomerating agent copolymer having an elastomeric "core" and grafted thereto a "shell" of interpolymer comprising polymerized acid and ester comonomers.

European Publication No. 0406806 A2 discloses an agglomerated rubber copolymer prepared by emulsion-polymerizing an alkyl acrylate/1,3-butadiene mixture, and then agglomerating the resulting rubbery copolymer. The agglomeration is effected by adding (a) an acid group-containing copolymer prepared by emulsion polymerizing an alkyl methacrylate/unsaturated monomer mixture, and (b) an oxy acid salt selected from alkali metal, alkaline earth metal, zinc, nickel, and aluminum salts of oxy acids.

When an alkyl acrylate is used as an agglomerating agent of a rubber latex, a semi-batch type is employed due to a severely exothermic reaction of the alkyl acrylate. This process has an advantage in removal of exothermic heat. However, the process does not form uniform cores, and provides latex particles having a large distribution of particle size.

When an ionic comonomer is used in the preparation of an agglomerating agent for agglomerating rubber latex, the ionic comonomer should exist at the surface of the agglomerating agent to be prepared, thus having a high agglomeration effect. According to conventional methods for preparing an agglomerating agent, the ionic comonomer exists inside the agglomerating agent, but not at the surface of the agent.

The present inventors developed an agglomerating agent which can effectively agglomerate rubber latex by reducing reaction times of agglomeration.

U.S. Pat. No. 5,294,659 teaches a method for emulsion polymerization of butadiene in an emulsion polymerization medium, comprising providing an emulsion polymerization medium containing monomer consisting essentially of butadiene and up to about 50% by weight of an aryl olefin comonomer, and a soap, and adding an acrylic latex to the emulsion polymerization medium during the polymerization.

Korean Patent Publication No. 94-10341 teaches a method for preparing rubber latex having increased particle sizes by adding 0.1~10 parts by weight of a latex for controlling particle size, comprising diene monomers and aqueous monomers capable of agglomerating polymers, at the time of polymerization conversion rate of 80%. And, Korean Patent Publication No. 96-854 discloses a method for preparing a latex having an increased particle size, a high solids content and a high glass transition temperature, comprising reacting an aryl olefin compound or alkyl methacrylate compound with/without a vinyl cyanide compound in the presence of an emulsion polymerization medium, and adding 0.1~10 parts by weight of a controlling agent of particle size to the emulsion polymerization medium when the polymerization conversion rate reaches to 5~50%.

Considering the reaction temperature and solids content of a rubber latex, conventional methods cannot produce rubber latex having an increased particle size. Particularly, when a certain solids content of rubber latex is to obtain, the reaction times are long, which is uneconomical in the production of rubber latex.

In accordance with the present invention, the inventors provide methods for preparing rubber latex having an increased particle size at a certain reaction temperature and solids content, and for reducing reaction times, thereby improving productivity of rubber latex.

OBJECTS OF THE INVENTION

An object of this invention is to provide methods for preparing a polybutadiene latex, which can shorten reaction times in polymerization of butadiene and agglomeration of polybutadiene when a polybutadiene latex is produced.

Another object of the invention is to provide methods for preparing rubber latex having an increased particle size at a certain reaction temperature and solids content.

A further object of the invention is to provide methods for preparing rubber latex for improving productivity thereof by shortening reaction times in polymerization of butadiene and agglomeration of polybutadiene.

A further object of the invention is to provide a polybutadiene latex that can provide a good impact strength, when the latex is applied to an impact-resistant resin composition.

A further object of the invention is to provide an agglomerating agent that ionic comonomers polymerized with alkyl acrylate exist at the surface of the agglomerating agent to be prepared in a sufficient amount, thus having a high agglomeration effect.

A still further object of the invention is to provide methods for preparing an agglomerating agent that ionic comonomers polymerized with alkyl acrylate exist at the surface of the agglomerating agent to be prepared in a sufficient amount, thus having a high agglomeration effect.

These and additional objects can be achieved by the resin compositions according to the present invention.

SUMMARY OF THE INVENTION

In accordance with the present invention, the method for preparing a polybutadiene latex comprises providing an emulsion polymerization medium by reacting a mixture of water, butadiene monomers, a surfactant, a chain transfer agent, an initiator and an electrolyte, preferably at a temperature of about 60~80° C. for about 8~16 hours, whereby a conversion rate being 80~100%, a solids content of the polymerized latex being about 35~45%, and a particle size being 1000~3500 Å, and agglomerating the resulting emulsion polymerization medium at a temperature of 5~20° C. higher than the polymerization temperature for 4~12 hours by adding a surfactant and an agglomerating agent to the emulsion polymerization medium in a consecutive order, whereby the particle size of the final polybutadiene latex is in the range of 3000~15000 Å.

In this invention, a surfactant is used in the amount of 0.5~3.0 parts by weight in the polymerization step, and in the amount of 0.1~2.5 parts by weight in the agglomeration step, per 100 parts by weight of butadiene monomers.

In the polymerization step, a chain transfer agent of 0.3~1.0 parts by weight and an electrolyte of 0.3~1.5 parts by weight are used per 100 parts by weight of butadiene monomers.

In the agglomeration step, an agglomerating agent of 0.1~5.0 parts by weight is used per 100 parts by weight of butadiene monomers.

In accordance with the present invention, the polybutadiene latex can be prepared within 12~28 hours, thereby shortening preparation times, and expected to have a good impact strength, when the latex is applied to an impact-resistant resin composition, because coagulum is not formed.

An agglomerating agent of this invention is prepared with an alkyl acrylate, an ionic comonomer, an anionic surfactant and an anionic initiator.

The method for preparing the agglomerating agent comprises a first step of forming agglomerating seeds by batch polymerization of an alkyl acrylate of $C_1$~$C_{12}$, an anionic surfactant and an anionic initiator, thereby conversion rate being more than 90%, a second step of growing the agglomerating agent in semi-batch polymerization by adding an alkyl acrylate of $C_1$~$C_{12}$ and an ionic comonomer to the resulting polymer of the first step, and a third step of copolymerizing the ionic comonomer at the surface of the agglomerating agent to be prepared in a sufficient amount, by adding an alkyl acrylate of $C_1$~$C_{12}$, an ionic comonomer and an anionic initiator to the resulting polymer of the second step, thus having a high agglomeration effect.

The agglomerating agent of this invention composes of 0.1~0.5 parts by weight of an ionic comonomer, 0.5~4.0 parts by weight of an anionic surfactant, and 0.3~2.0 parts by weight of an anionic initiator, per 100 parts by weight of alkyl acrylate. For the total alkyl acrylate to be used, 5% or less by weight is used in the first step, about 90% by weight is used in the second step, and the remaining alkyl acrylate is used in the third step. For the total ionic comonomer to be used, 5~20% by weight is used in the second step, and 80~95% by weight is used in the third step. For the total anionic initiator to be used, 90~70% by weight is used in the first step, and 10~30% by weight is used in the third step.

DETAILED DESCRIPTION OF THE INVENTION

In accordance with the present invention, the method for preparing a polybutadiene latex comprises a polymerization step for providing an emulsion polymerization medium of butadiene, and an agglomeration step for agglomerating the polybutadiene latex which has been prepared in the polymerization step.

The polymerization step is carried out in conventional emulsion polymerizations by reacting water, butadiene monomers, a surfactant, a chain transfer agent, an initiator and an electrolyte at a temperature of 60~80° C. for 8~16 hours, whereby a conversion rate being 80~100%. The butadiene monomers are added so that a solids content of the polymerized latex may be 35~45%. In a polymerization of polybutadiene latex, the higher the solids content of the latex is, the longer the polymerization time is. Accordingly, it is preferable that the solids content of the polymerized latex is in the range of 35~45% in this invention. Also, it is preferable that the particle size of polybutadiene latex is in the range of 1000~3500 Å.

Representative examples of a surfactant to be used in this invention are sodium laurylsulfate, potassium oleate and rosin soap, which are used in an aqueous state. In the polymerization step, a surfactant is used in the amount of 0.5~3.0 parts by weight per 100 parts by weight of butadiene monomers. The surfactant is used also in the agglomeration step following the polymerization step. The function of the surfactant in the polymerization step is to form a primary particle size of polybutadiene latex, and the function of the surfactant in the agglomeration step is to provide stability of polybutadiene latex.

Illustrative examples of a chain transfer agent usable in this invention are tert-dodecyl mercaptan, methyl mercaptan, and tert-butyl mercaptan. In the polymerization step, a chain transfer agent is preferably used in the amount of 0.3~1.0 parts by weight per 100 parts by weight of butadiene monomers. If the chain transfer agent is used in excess of the amount or less than the amount, the polybutadiene latex cannot have a good particle shape when they agglomerate, and it is difficult to control the particle shape of the latex in the polymerization of acrylonitrile-butadiene-styrene.

Representative examples of an electrolyte to be used in this invention are calcium carbonate, sodium bicarbonate, and tricalcium phosphate. In the polymerization step, an electrolyte is used in the amount of 0.3~1.5 parts by weight per 100 parts by weight of butadiene monomers. The amount of an electrolyte can control the particle size and distribution of particle size of polybutadiene latex, and provide stability of polybutadiene latex.

After adding water, butadiene monomers, a surfactant, a chain transfer agent, and an electrolyte, the reaction temperature will be increased to 60~80° C. for emulsion polymerization. The temperature is reached, polymerization is carried out by adding an initiator such as potassium persulfate to the reactor. Use of an initiator will be apparent to an ordinary skilled person in the art. The polymerization should be carried out for 8~16 hours so that a conversion rate may be 80~100%, thereby a solids content of polybutadiene latex being 35~45%, and a particle size being 1000~3500 Å.

When the polymerization step has been completed, agglomeration step is proceeded. An agglomerating agent and a surfactant are added to the emulsion polymerization medium. After raising the reaction temperature 5~20° C. higher than that of polymerization step, polybutadiene latex is agglomerated for 4~12 hours.

The agglomerating agent to be used in the agglomeration step composes of an alkyl acrylate, an ionic comonomer, an anionic surfactant and an anionic initiator.

The agglomerating agent is prepared by a method comprising a first step of forming agglomerating seeds by batch polymerization of an alkyl acrylate of $C_1~C_{12}$, an anionic surfactant and an anionic initiator, thereby conversion rate being more than 90%, a second step of growing the agglomerating agent in semi-batch polymerization by adding an alkyl acrylate of $C_1~C_{12}$ and an ionic comonomer to the resulting polymer of the first step, and a third step of copolymerizing the ionic comonomer at the surface of the agglomerating agent to be prepared in a sufficient amount, by adding an alkyl acrylate of $C_1~C_{12}$, an ionic comonomer and an anionic initiator to the resulting polymer of the second step, thus having a high agglomeration effect.

The agglomerating agent of this invention composes of 0.1~0.5 parts by weight of an ionic comonomer, 0.5~4.0 parts by weight of an anionic surfactant, and 0.3~2.0 parts by weight of an anionic initiator, per 100 parts by weight of alkyl acrylate. For the total alkyl acrylate to be used, 5% or less by weight is used in the first step, about 90% by weight is used in the second step, and the remaining alkyl acrylate is used in the third step. For the total ionic comonomer to be used, 5~20% by weight is used in the second step, and 80~95% by weight is used in the third step. For the total anionic initiator to be used, 90~70% by weight is used in the first step, and 10~30% by weight is used in the third step.

In the first step, seeds of agglomerating agent are formed by batch polymerization of alkyl an acrylate, an anionic surfactant and an anionic initiator. It is preferable that conversion rate should be more than 90%. An anionic surfactant of 0.5~4.0 parts by weight per 100 parts of the total alkyl acrylate may be used in the first step. For the total alkyl acrylate to be used in the preparation of the agglomerating agent, 5% or less by weight is used in the first step. This amount of alkyl acrylate in the first step can form seeds of agglomerating agent, and prevent enlarging distribution of particle size of the agent, thereby preparing uniform particle size of the agent. An anionic initiator of 0.3~2.0 parts by weight per 100 parts of the total alkyl acrylate may be used in the first step. For the total anionic initiator to be used, 90~70% by weight is used in the first step.

In the second step, the agglomerating agent is grown in semi-batch polymerization by adding an alkyl acrylate of $C_1~C_{12}$ and an ionic comonomer to the resulting polymer of the first step. The ionic comonomer is a functional monomer which exists at the surface of the agglomerating agent. For the total alkyl acrylate to be used, about 90% by weight is used in the second step. An ionic comonomer is used in the amount of 0.1~0.5 parts by weight per 100 parts of alkyl acrylate. Among them, 5~20% by weight of an anionic comonomer is used in the second step. The second step is to grow particle size of agglomerating agent. In this step, addition rate of monomers should be controlled so as to balance the equivalence between exothermic heat from the polymerization of alkyl acrylate and radiation heat to the outside system. The semi-batch polymerization can be easily carried out by an ordinary skilled person in the art.

In the third step, an alkyl acrylate of $C_1~C_{12}$, an ionic comonomer and an anionic initiator are added to the resulting polymer of the second step, and the ionic comonomer is copolymerized at the surface of the agglomerating agent to be prepared, thus having a high agglomeration effect. It is preferable that conversion rate should be more than 95%.

Among the total amount of alkyl acrylate used in the three steps, 5% by weight of alkyl acrylate is used in the third step, and 95% by weight is used in the first and second steps. Among the total amount of ionic comonomer to be used, 80~95% by weight of an ionic comonomer is used in the third step. Among the total amount of anionic initiator to be used, 10~30% by weight of an anionic initiator is used in the third step. The reason why a high portion of an ionic comonomer is employed in the third step is that more ionic comonomers are copolymerized at the surface of the agglomerating agent to be prepared, thus having a high agglomeration effect. An anionic initiator is added after ionic comonomers are sufficiently impregnated into the agglomerating agent.

This addition of an anionic initiator helps the ionic comonomers or other remaining monomers to be copolymerized at the surface of the agglomerating agent.

Alkyl acrylates of from 1 to 12 carbon atoms may be used for preparing an agglomerating agent of the invention, and butyl acrylate can be preferably used.

An ionic comonomer of this invention is a functional monomer which exists at the surface of the agglomerating agent. Unsaturated carboxylic acids and acrylic amides are used as ionic comonomer. Illustrative examples of unsaturated carboxylic acids are methacrylic acid, acrylic acid, itaconic acid, chrotonic acid, and maleic anhydride, and those of acrylic amides are acryl amide, methacryl amide, ethacryl amide, and n-butylacryl amide.

Representative examples of an anionic surfactant usable in this invention are disodium alkyl sulfosuccinate, disodium ethoxylated nonylphenol, sodium lauryl sulfate, and potassium oleate.

Representative examples of an anionic initiator usable in this invention are potassium carbonate, ammonium bicarbonate, and ammonium carbonate.

It is preferable that the average particle size of agglomerating agent of this invention is in the range of 0.05~0.2 µm. Polybutadiene latex is agglomerated using this agglomerating agent. An agglomerating agent of 0.1~5.0 parts by weight per 100 parts by weight of polybutadiene latex may be used for agglomeration.

As mentioned above, when the polymerization step has been completed, an agglomeration step is proceeded using the agglomerating agent of this invention. An agglomerating agent and a surfactant are added to the emulsion polymerization medium, when conversion rate reaches to 80~100%. A surfactant of 0.1~5.0 parts by weight per 100 parts by weight of butadiene monomer is used in this step. After raising the reaction temperature 5~20° C. higher than that of polymerization step, polybutadiene latex is agglomerated for 4~12 hours.

If polybutadiene latex is agglomerated using this agglomerating agent, it is preferable that the average particle size of agglomerated polybutadiene latex is in the range of 3000~15000 Å.

According to the present invention, the polymerization step has been completed in 8~16 hours, and the agglomeration step has been completed in 4~12 hours. Therefore, this invention can shorten reaction times in polymerization of butadiene and agglomeration of polybutadiene, when a polybutadiene latex is produced.

The methods for preparing polybutadiene latex according to the present invention have effects of the invention, which can provide polybutadiene latex having an increased particle size at a certain reaction temperature and solids content, and improve productivity of polybutadiene latex by shortening reaction times in polymerization of butadiene and agglomeration of polybutadiene.

The invention may be better understood by reference to the following examples which are intended for purposes of illustration and are not to be construed as in any way limiting the scope of the present invention, which is defined in the claims appended hereto.

EXAMPLES 1~3

Preparation of Agglomerating Agent

Example 1

First step: To a 5 l reactor equipped with a reflux cooling apparatus were added 400 g of deionized water, 5 g of butyl acrylate, and 2.4 g of disodium alkyl sulfosuccinate (Aerosol 501® from American Cynamide Co.). The temperature was raised agitating the solution in 300 rpm. When the temperature was 70° C., an anionic initiator was added to the solution. The initiator was prepared dissolving 1 g of persulfate in 20 g of deionized water. The second step was carried out when the temperature was reduced during initiation reaction.

Second step: To the resulting polymer solution of the first step were added 190 g of butyl acrylate and 0.1 g of methacrylic acid. The solution was polymerized in semi-batch polymerization. When the polymerization was completed, the third step was carried out.

Third step: To the resulting solution of the second step were added 5 g of butyl acrylate and 0.4 g of methacrylic acid. An anionic initiator was added to the solution. The initiator was prepared dissolving 0.2 g of persulfate in 10 g of deionized water.

The average particle diameter of the agglomerating agent of Example 1 was 0.13 µm, conversion rate was 97.0%, and standard deviation was 0.12.

Example 2

The procedure of Example 1 was carried out except using 0.25 g of methacrylic acid in the second step and 0.25 g of methacrylic acid in the third step. The average particle diameter of the agglomerating agent of Example 2 was 0.15 µm, and standard deviation was 0.14.

Example 3

The procedure of Example 1 was carried out except using 0.4 g of methacrylic acid in the second step and 0.1 g of methacrylic acid in the third step. The average particle diameter of the agglomerating agent of Example 3 was 0.16 µm, and standard deviation was 0.18.

Comparative Example 1

In Comparative Example 1, an agglomerating agent was prepared by a conventional batch polymerization method. To a reactor were added 200 g of butyl acrylate, 0.5 g of methacrylic acid, 2.4 g of disodium alkyl sulfosuccinate (Aerosol 501® from American Cynamide Co.), 1.2 g of potassium sulfate, and 400 g of deionized water. The polymerization was carried out in a conventional batch method. All of the monomers were added together at the beginning of polymerization. The average particle diameter of the agglomerating agent of this example was 0.14 µm, and standard deviation was 0.15.

Comparative Example 2

To a reactor were added 70 g of butyl acrylate, 2.4 g of disodium alkyl sulfosuccinate (Aerosol 501® from American Cynamide Co.), 0.2 g of potassium sulfate, and 400 g of deionized water. The polymerization of the solution was carried out for 1 hour, then 130 g of butyl acrylate, 0.5 g of methacrylic acid, and 1.0 g of potassium persulfate were added to the solution over 1 hour. In this example, monomers were added in two steps. The average particle diameter of the agglomerating agent of this example was 0.13 µm, and standard deviation was 0.19.

Preparation of Polybutadiene Latex:

A polybutadiene latex having an average particle diameter of 0.12 µm and a solids content of 40% was agglomerated with the agglomerating agents prepared in Examples 1~3 and Comparative Examples 1~2. The agglomerating agent was used in the amount of 0.3 parts by weight per 100 parts by weight of polybutadiene latex. The agglomeration was carried out at same circumstances in a conventional method.

Table 1 shows average particle diameter of agglomerating agent (Aver. D of AgAg), standard deviation (SD), and average particle diameter of polybutadiene latex (Aver. D of PBL) agglomerated with the agents of Examples 1~3 and Comparative Examples 1~2.

TABLE 1

| Examples | Aver. D of AgAg (µm) | SD | Aver. D of PBL (Å) |
| --- | --- | --- | --- |
| Example 1 | 0.13 | 0.12 | 8250 |
| Example 2 | 0.15 | 0.14 | 7403 |
| Example 3 | 0.16 | 0.18 | 6905 |
| Comp. Exam. 1 | 0.14 | 0.15 | 6230 |
| Comp. Exam. 2 | 0.13 | 0.19 | 6515 |

As shown in Table 1, the agglomerating agent of Example 1 according to the present invention has preferable particle diameter and standard deviation, and prepares butadiene latex having increased particle size. Although Examples 2 and 3 were carried out according to the three steps of this invention, the average particle diameters of agglomerating agent and standard deviations are larger than those of Example 1. Also, the average diameters of polybutadiene latex of Examples 2 and 3 are smaller than that of Example 1. It is believed that, in Example 1, an ionic comonomer was used in the third step in a quite larger amount than in the first or second step.

Comparative Example 1 according to a conventional method prepared a polybutadiene latex having the smallest particle diameter among the examples. In Comparative Example 2 carried out in a two step method, average particle diameter of agglomerating agent is good, but standard deviation and average particle diameter of polybutadiene latex are not good.

EXAMPLES 4~7

Preparation of Polybutadiene Latex

Example 4

A 10 l high pressure reactor was charged with 3377 g of deionized water, 3000 g of butadiene monomer, 15 g of tert-dodecyl mercaptan, 45 g of 10% calcium carbonate solution, and 210 g of rosin soap. The temperature of the reactor was raised agitating the solution in 250 rpm. When the temperature was 65° C., an anionic initiator was added to the solution. The initiator was prepared dissolving 9 g of persulfate in 441 g of deionized water. After 12 hours of polymerization, conversion rate was measured as 83%, then 200 g of rosin soap and 50 g of agglomerating agent were added. The reaction temperature was raised at 75° C. Agglomeration had been carried out for 4 hours. At the completion of agglomeration, conversion rate was measured as 92.3%. An average particle diameter of polybutadiene latex was 0.57 μm, unagglomerated portion was about 15%, and coagulum was less than 0.1%.

Example 5

The procedure of Example 4 was carried out except that the agglomerating agent of 50 g was added after 10 hours of polymerization, and that agglomeration was completed after 19 hours from the beginning. Conversion rates are 67% after 10 hours and 91.5% after 19 hours. An average particle diameter of polybutadiene latex was 0.60 μm, unagglomerated portion was about 12%, and coagulum was less than 0.1%.

Comparative Example 3

The procedure of Example 4 was carried out except that agglomerating agent of 50 g was added after 8 hours of polymerization, and that agglomeration was completed after 24 hours from the beginning. Conversion rates are 51.5% after 8 hours and 93.7% after 24 hours. An average particle diameter of polybutadiene latex was 0.53 μm, unagglomerated portion was about 16%, and coagulum was less than 0.1%.

Example 6

The procedure of Example 4 was carried out except that deionized water of 4421 g was added after 10 hours of polymerization, and that agglomeration was completed after 14 hours from the beginning. Conversion rates are 77.3% after 10 hours and 90.1% after 14 hours. An average particle diameter of polybutadiene latex was 0.45 μm, unagglomerated portion was about 10%, and coagulum was less than 0.1%.

Comparative Example 4

The procedure of Example 4 was carried out except not using rosin soap. Immediately after agglomerating agent was added, some microcoagulum occurred.

Comparative Example 5

The procedure of Example 4 was carried out except that 0.47 parts by weight of surfactant per 100 parts by weight of butadiene monomer was added. An average particle diameter of polybutadiene latex was 0.67 μm, unagglomerated portion was about 10%, and coagulum was about 2.3%.

Example 7

A 10 l high pressure reactor was charged with 2711.8 g of deionized water, 3500 g of butadiene monomer, 17.5 g of tert-dodecyl mercaptan, 450 g of 10% calcium carbonate solution, and 300 g of rosin soap. The temperature of the reactor was raised agitating the solution in 250 rpm. When the temperature was 65° C., an anionic initiator was added to the solution. The initiator was prepared dissolving 9 g of persulfate in 441 g of deionized water. After 16 hours of polymerization, conversion rate was measured as 78%, then 200 g of rosin soap and 50 g of agglomerating agent were added. The reaction temperature was raised at 75° C. Agglomeration had been carried out for 4 hours. At the completion of agglomeration, conversion rate was measured as 91.2%. An average particle diameter of polybutadiene latex was 0.50 μm, unagglomerated portion was about 23%, and coagulum was about 0.8%.

Comparative Example 6

The procedure of Example 7 was carried out except that 2157.5 parts by weight of deionized water was added, and that 200 g of rosin soap and 50 g of agglomerating agent were added after 26 hours of polymerization. Conversion rate was 67% after 26 hours. Immediately after agglomerating agent was added, some microcoagulum occurred.

Comparative Example 7

The procedure of Example 4 was carried out except that the temperature was kept at 65° C. even after agglomerating agent was added, and that agglomeration had been carried out for 6 hours, total reaction time being 18 hours. At the completion of agglomeration, conversion rate was measured as 93%. An average particle diameter of polybutadiene latex was 0.50 μm, unagglomerated portion was about 23%, and coagulum was less than 0.1%.

Table 2 shows conversion rate (%) at the time of addition of agglomerating agent, total reaction time (hrs), and average particle diameter of polybutadiene latex (Aver. D of PBL) agglomerated. The total polymerization time is shortened when an agglomerating agent is added at a high conversion. So, the addition time of agglomerating agent is preferable when the conversion rate is in the range of 85~100%.

TABLE 2

| Examples | conversion rate (%) | total reaction time (hrs) | Aver. D of PBL (μm) |
|---|---|---|---|
| Example 4 | 83 | 16 | 0.57 |
| Example 5 | 67 | 19 | 0.60 |
| Comp. Exam. 3 | 51.5 | 24 | 0.53 |

Table 3 shows solids content (%) of polybutadiene latex, total reaction time (hrs), average particle diameter of polybutadiene latex (Aver. D of PBL) agglomerated, and portion of coagulum. The lower solids content of polybutadiene latex is, the less total polymerization time is. In excess of 50% of solids content, some microcoagulum has occurred. Considering productivity in terms of total reaction time and stability of polybutadiene latex, it is preferable that the latex has solids content of 35~45%.

TABLE 3

| Examples | solids cont. (%) | reaction time (hrs) | Aver. Dia. (μm) | coagulum (%) |
|---|---|---|---|---|
| Example 4 | 40 | 16 | 0.57 | <0.1 |
| Example 6 | 35 | 14 | 0.45 | <0.1 |
| Example 7 | 45 | 20 | 0.50 | 0.8 |
| Comp. Exam. 7 | 50 | 26 | — | microcoagulum occurred |

Table 4 shows the relation between amount of surfactant added at the agglomeration step and coagulum to be occurred.

TABLE 4

| Examples | surfactant (wt. %) | coagulum (%) |
|---|---|---|
| Example 4 | 1.67 | <0.1 |
| Comp. Exam. 4 | 0 | microcoagulum occurred |
| Comp. Exam. 5 | 0.47 | 2.3 |

To stabilize the polybutadiene latex, the amount of surfactant in agglomeration step should be above 0.47 parts by weight per 100 parts of butadiene monomer. However, when the amount of surfactant is in excess of 2.5 parts by weight per 100 parts of butadiene monomers, excess of foam is occurred in polybutadiene production process and properties of final product are not good.

Further, as shown in Example 4 and Comparative Example 7, when the reaction temperature raised about 10° C., the total reaction time could shorten about two hours.

It is apparent from the above that many modifications and changes are possible without departing from the spirit and scope of the present invention.

What is claimed is:

1. A method for preparing an agglomerating agent comprising:
    a first step of forming agglomerating seeds by batch polymerization of an alkyl acrylate of $C_1$~$C_{12}$, an anionic surfactant and an anionic initiator;
    a second step of growing, the agglomerating agent in semi-batch polymerization by adding an alkyl acrylate of $C_1$~$C_{12}$ and an ionic comonomer to the resulting polymer of the first step; and, when the polymerization is completed,
    a third step of copolymerizing the ionic comonomer at the surface of the agglomerating agent by adding an alkyl acrylate of $C_1$~$C_{12}$, an ionic comonomer and an anionic initiator to the resulting polymer of the second step.

2. The method for preparing an agglomerating agent according to claim 1 wherein said alkyl acrylate is used in the amount of about 5% or less by weight in the first step, and in the amount of about 90% by weight in the second step, and the remaining alkyl acrylate is used in the third step.

3. The method for preparing an agglomerating agent according to claim 1 wherein said ionic comonomer is used in the amount of about 5~20% by weight in the second step, and in the amount of about 80~95% by weight in the third step.

4. The method for preparing an agglomerating agent according to claim 1 wherein said anionic initiator is used in the amount of about 90~70% by weight in the first step, and in the amount of about 10~30% by weight in the third step.

5. The method for preparing an agglomerating agent according to claim 3 wherein said ionic comonomer is an unsaturated carboxylic acid or an acrylic amide.

6. The method for preparing an agglomerating agent according to claim 5 wherein said unsaturated carboxylic acid is selected from the group consisting of methacrylic acid, acrylic acid, itaconic acid, chrotonic acid, and maleic anhydride.

7. The method for preparing an agglomerating agent according to claim 5 wherein said acrylic amide is selected from the group consisting of acryl amide, methacryl amide, ethacryl amide, and n-butylacryl amide.

8. The method for preparing an agglomerating agent according to claim 1 wherein said anionic surfactant is selected from the group consisting of disodium alkyl sulfosuccinate, disodium ethoxylated nonylphenol, sodium lauryl sulfate, and potassium oleate.

9. The method for preparing an agglomerating agent according to claim 1 wherein said anionic initiator is selected from the group consisting of potassium carbonate, ammonium bicarbonate, and ammonium carbonate.

10. The method for preparing an agglomerating agent according to claim 1 wherein said first step has a conversion rate of 90% or more.

11. The method for preparing an agglomerating agent according to claim 1 wherein said anionic initiator is added after ionic comonomers are sufficiently impregnated into the agglomerating latex.

12. An agglomerating agent prepared according to according to the method of claim 1.

13. The method for preparing a polybutadiene latex according to claim 1 wherein the agglomerating agent is prepared by:
    a first step of forming agglomerating seeds by batch polymerization of an alkyl acrylate of $C_1$~$C_{12}$, an anionic surfactant and an anionic initiator;
    a second step of growing the agglomerating agent in semi-batch polymerization by adding an alkyl acrylate of $C_1$~$C_{12}$ and an ionic comonomer to the resulting polymer of the first step; and
    a third step of copolymerizing the ionic comonomer at the surface of the agglomerating agent to be prepared in a sufficient amount, by adding an alkyl acrylate of $C_1$~$C_{12}$, an ionic comonomer and an anionic initiator to the resulting polymer of the second step.

14. A method for preparing an agglomerating agent comprising:
    a first step of forming agglomerating seeds by batch polymerization of an alkyl acrylate of $C_1$~$C_{12}$, an anionic surfactant and an anionic initiator;

a second step of growing the agglomerating agent in semi-batch polymerization by adding an alkyl acrylate of $C_1$~$C_{12}$ and an ionic comonomer to the resulting polymer of the first step; and, when the polymerization is completed, a third step of copolymerizing the ionic comonomer at the surface of the agglomerating agent by adding an alkyl acrylate of $C_1$~$C_{12}$, an ionic comonomer and an anionic initiator to the resulting polymer of the second step wherein said agglomerating agent is composed of about 0.1~0.5 parts by weight of an ionic comonomer, about 0.5~4.0 parts by weight of an anionic surfactant, and about 0.3~2.0 parts by weight of an anionic initiator, per 100 parts by weight of alkyl acrylate.

* * * * *

UNITED STATES PATENT AND TRADEMARK OFFICE
CERTIFICATE OF CORRECTION

PATENT NO. : 5,985,993  
DATED : November 16, 1999  
INVENTOR(S) : Byeong-Do Lee and Dong-Un Jin Page 1 of 1

It is certified that error appears in the above-identified patent and that said Letters Patent is hereby corrected as shown below:

Column 12,  
Lines 48, "The" should read - A- ; The following phrase should be added after line 48: - comprising: providing an emulsion polymerization medium by reacting water, butadiene monomers, a surfactant, a chain transfer agent, an initiator and an electrolyte so that a conversion rate of about 80 ~ 100% is obtained; and agglomerating the resulting emulsion polymerization medium by adding a surfactant and an agglomerating agent to the emulsion polymerization medium in consecutive order -; the phrase, "according to claim 1" should be deleted.

Signed and Sealed this

Fourteenth Day of August, 2001

*Attest:*

*Attesting Officer*

NICHOLAS P. GODICI  
*Acting Director of the United States Patent and Trademark Office*